US011913249B2

(12) United States Patent
Nye et al.

(10) Patent No.: US 11,913,249 B2
(45) **Date of Patent: *Feb. 27, 2024**

(54) MODULAR AND INTERCHANGEABLE LOCK PLUG

(71) Applicant: Schlage Lock Company LLC, Carmel, IN (US)

(72) Inventors: James Nye, Colorado Springs, CO (US); Brian E. Walls, Colorado Springs, CO (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/695,122

(22) Filed: Mar. 15, 2022

(65) Prior Publication Data

US 2023/0035220 A1 Feb. 2, 2023

Related U.S. Application Data

(63) Continuation of application No. 16/702,844, filed on Dec. 4, 2019, now Pat. No. 11,274,468.

(51) Int. Cl.

| | |
|---|---|
| ***E05B 27/00*** | (2006.01) |
| ***E05B 19/00*** | (2006.01) |
| ***E05B 35/10*** | (2006.01) |
| ***E05B 29/00*** | (2006.01) |

(52) U.S. Cl.

CPC ...... *E05B 27/0053* (2013.01); *E05B 19/0035* (2013.01); *E05B 29/0046* (2013.01); *E05B 35/10* (2013.01)

(58) Field of Classification Search

CPC ............ E05B 19/0035; E05B 27/0053; E05B 27/0082; E05B 29/0046; E05B 29/0066; E05B 35/08; E05B 35/10

See application file for complete search history.

(56) References Cited

U.S. PATENT DOCUMENTS

| | | | |
|---|---|---|---|
| 2,061,456 | A | 11/1936 | Falk |
| 2,460,709 | A | 2/1949 | Navarro |
| 2,890,582 | A | 6/1959 | Navarro |
| 3,035,433 | A | 5/1962 | Testa |
| 4,416,129 | A | 11/1983 | Thimot |

(Continued)

OTHER PUBLICATIONS

International Search Report; International Searching Authority; International Patent Application No. PCT/US2020/063336; dated May 5, 2021; 3 pages.

(Continued)

*Primary Examiner* — Christopher J Boswell

(74) *Attorney, Agent, or Firm* — Taft Stettinius & Hollister LLP

(57) ABSTRACT

An exemplary lock apparatus includes a housing and a plug assembly rotatably mounted in the housing. The plug assembly includes a tumbler assembly operable to selectively prevent rotation of the plug assembly relative to the housing and a retention mechanism operable to selectively prevent removal of the plug assembly from the housing. A system including the lock apparatus may include a change key configured to actuate the tumbler assembly without actuating the retention mechanism and/or a control key configured to actuate both the tumbler assembly and the retention mechanism.

13 Claims, 8 Drawing Sheets

(56) References Cited

U.S. PATENT DOCUMENTS

| | | | | |
|---|---|---|---|---|
| 4,484,462 | A | 11/1984 | Berkowitz | |
| 4,648,643 | A | 3/1987 | Bettger | |
| 4,715,201 | A | 12/1987 | Craig | |
| 4,976,123 | A | 12/1990 | Ceron et al. | |
| 5,109,685 | A | 5/1992 | Westwinkel | |
| 5,182,929 | A | 2/1993 | Myers | |
| 5,325,691 | A | 7/1994 | Embry | |
| 5,964,110 | A | 10/1999 | Crocco et al. | |
| 5,970,762 | A * | 10/1999 | Myers | E05B 29/00 70/377 |
| 6,263,713 | B1 * | 7/2001 | Fantl | E05B 17/0004 225/2 |
| 6,301,942 | B1 | 10/2001 | Shvarts | |
| 6,477,875 | B2 | 11/2002 | Field et al. | |
| 6,701,761 | B1 * | 3/2004 | Chang | E05B 35/08 70/369 |
| 7,225,651 | B2 | 6/2007 | Edwards et al. | |
| 7,810,365 | B2 | 10/2010 | Villani | |
| 7,900,491 | B2 | 3/2011 | Chong | |
| 8,448,485 | B1 | 5/2013 | Widen | |
| 8,621,902 | B2 | 1/2014 | Mathachan | |
| 8,656,747 | B2 | 2/2014 | Armstrong et al. | |
| 9,309,695 | B2 | 4/2016 | Westwinkel et al. | |
| 9,598,880 | B2 | 3/2017 | Walls et al. | |
| 11,274,468 | B2 * | 3/2022 | Nye | E05B 27/0053 |
| 11,359,405 | B2 * | 6/2022 | Misner | E05B 29/0053 |
| 2016/0312494 | A1 | 10/2016 | Kim et al. | |
| 2018/0305954 | A1 | 10/2018 | Walls et al. | |
| 2019/0383058 | A1 | 12/2019 | Misner | |

OTHER PUBLICATIONS

Written Opinion of the International Searching Authority; International Searching Authority; International Patent Application No. PCT/US2020/063336; dated May 5, 2021; 9 pages.

* cited by examiner

MODULAR AND INTERCHANGEABLE LOCK PLUG

CROSS REFERENCE TO RELATED APPLICATIONS

This application is a continuation of U.S. patent application Ser. No. 16/702,844 filed Dec. 4, 2019 and issued as U.S. Pat. No. 11,274,468, the contents of which are hereby incorporated herein by reference in their entirety.

TECHNICAL FIELD

The present disclosure generally relates to lock cylinders, and more particularly but not exclusively relates to modular and removable plugs for lock cylinders.

BACKGROUND

Interchangeable core lock cylinders are commonly installed to a housing (e.g., a handle of a lockset) to enable the lock cylinder to be selectively removed from the housing for rekeying or replacement without disturbing the housing (e.g., by removing the handle). Lock cylinders of this type generally include a shell, a plug rotatably mounted in the shell, a tumbler system operable to selectively prevent rotation of the plug relative to the shell, and a retaining lug that is rotatably mounted to the shell and selectively retains the entire lock cylinder within a housing. Upon insertion of a proper control key, the retaining lug can be rotated to a position in which the lug is positioned within the footprint of the tower of the shell, thereby enabling the entire lock cylinder to be removed from the housing as a complete unit. However, the towers of such lock cylinders are generally of approximately the same size as the plug. As a result, the housing must be large enough to retain this enlarged tower, which can limit the design options for the housing.

Another format of lock cylinder is the key-in-lever format. In comparison to interchangeable core locksets, the towers of key-in-lever format lock cylinders are much thinner, which enables the key-in-lever format cylinder to be installed in a greater variety of handle designed. However, key-in-lever format cylinders lack the interchangeable core functionality, and typically require that the handle be removed from the spindle in order for the cylinder to be removed for rekeying or replacement. Thus, while key-in-lever cylinders are typically more versatile than interchangeable core cylinders, they typically suffer from disadvantages related to ease of installation and/or replacement. Additionally, even the smaller profile of the key-in-lever format tower can limit the design options for the housing. For these reasons among others, there remains a need for further improvements in this technological field.

SUMMARY

An exemplary lock apparatus includes a housing and a plug assembly rotatably mounted in the housing. The plug assembly includes a tumbler assembly operable to selectively prevent rotation of the plug assembly relative to the housing and a retention mechanism operable to selectively prevent removal of the plug assembly from the housing. Further embodiments, forms, features, and aspects of the present application shall become apparent from the description and figures provided herewith.

DETAILED DESCRIPTION OF ILLUSTRATIVE EMBODIMENTS

Figure 1:
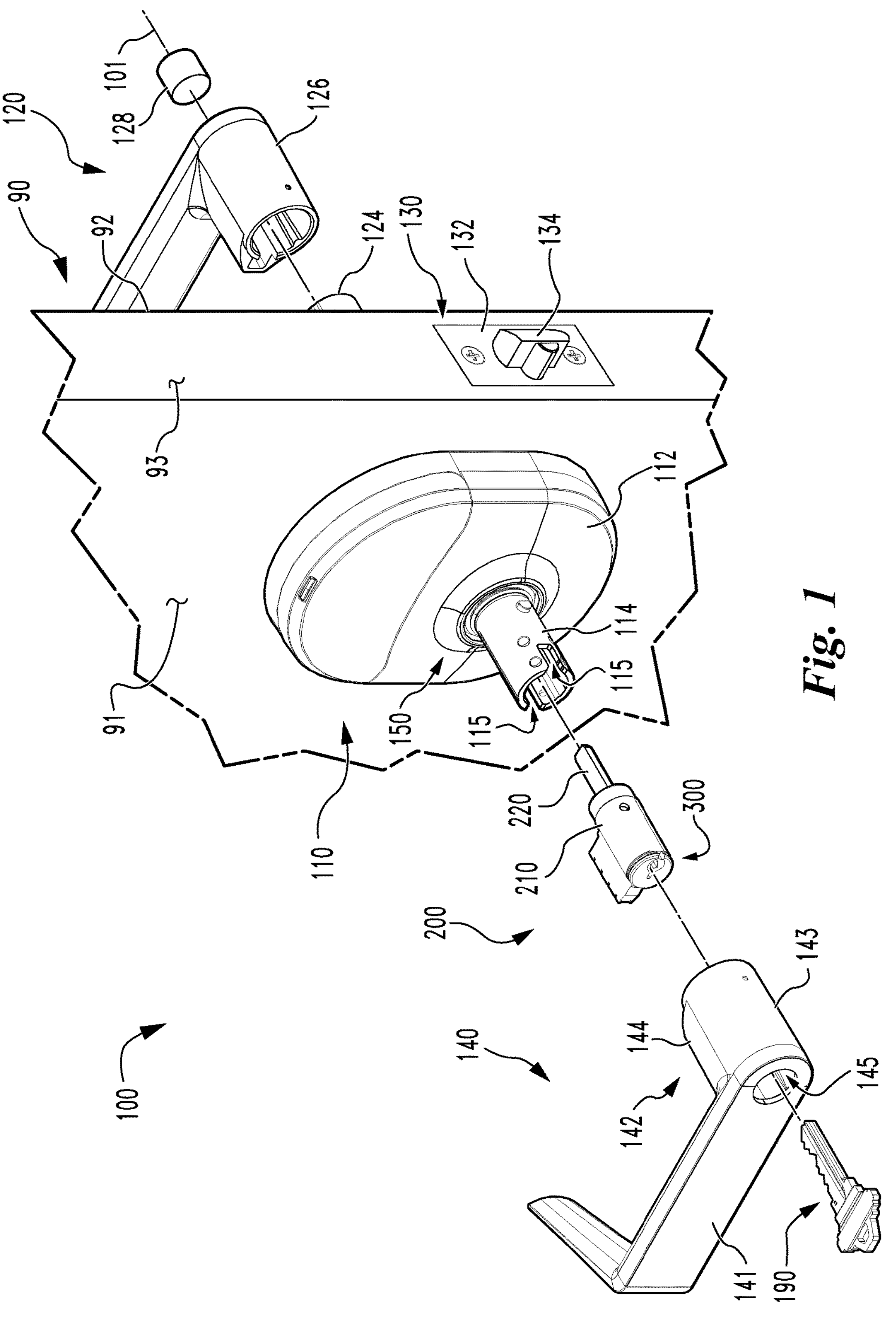
FIG. 1 is a partially exploded assembly view of a lockset according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the terms "longitudinal," "lateral," and "transverse" are used to denote motion or spacing along three mutually perpendicular axes, wherein each of the axes defines two opposite directions. In the coordinate system illustrated in FIG. 4, the X-axis defines first and second longitudinal directions including a proximal direction (downward and to the left in FIG. 4) and an opposite distal direction (upward and to the right in FIG. 4), the Y-axis defines first and second transverse directions, and the Z-axis defines first and second lateral directions. These terms are used for ease and convenience of description, and are without regard to the orientation of the system with respect to the environment. For example, descriptions that reference a longitudinal direction may be equally applicable to a vertical direction, a horizontal direction, or an off-axis orientation with respect to the environment.

Furthermore, motion or spacing along a direction defined by one of the axes need not preclude motion or spacing along a direction defined by another of the axes. For example, elements that are described as being "laterally offset" from one another may also be offset in the longitudinal and/or transverse directions, or may be aligned in the longitudinal and/or transverse directions. The terms are therefore not to be construed as limiting the scope of the subject matter described herein to any particular arrangement unless specified to the contrary.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

With reference to FIG. 1, illustrated therein is a door 90 having installed thereon a lockset 100 according to certain embodiments. The door 90 generally includes an exterior or non-egress side 91, an interior or egress side 92, and a free edge 93. The lockset 100 generally includes an outside assembly 110 mounted to the exterior side 91 of the door 90, an inside assembly 120 installed to the interior side 92 of the door 90, and a latchbolt mechanism 130 connected with the outside assembly 110 and the inside assembly 120. The outside assembly 110 includes an outside handle 140 and a lock cylinder 200, and the lockset 100 further includes a lock 150 having a locking state and an unlocking state, which respectively define locked and unlocked states of the lockset 100. As described herein, the illustrated lock cylinder 200 is operable by a key 190, and generally includes a shell 210, a plug assembly 300 rotatably mounted in the shell 210, and a tailpiece 220 rotationally coupled with a portion of the plug assembly 300.

The outside assembly 110 generally includes an outside housing 112, an outside spindle 114 rotatably mounted to the outside housing 112, an outside handle 140 rotationally coupled with the outside spindle 114, and a lock cylinder 200 according to certain embodiments, which is mounted within the outside spindle 114 and the outside handle 140. The outside spindle 114 includes a pair of longitudinally-extending slots 115, which are diametrically opposite one another. The outside spindle 114 is engaged with the lock 150, which selectively prevents the outside handle 140 from actuating the latchbolt mechanism 130. More specifically, when the lock 150 is in its locking state, the outside handle 140 is inoperable to actuate the latchbolt mechanism 130, thereby defining the locked state of the lockset 100. Conversely, when the lock 150 is in its unlocking state, the outside handle 140 is operable to actuate the latchbolt mechanism 130, and the lockset 100 is therefore in its unlocked state.

The inside assembly 120 generally includes an inside housing, an inside spindle 124 rotatably mounted to the inside housing, an inside handle 126 rotationally coupled with the inside spindle 124, and a lock input device 128 mounted within the inside spindle 124 and the inside handle 116. The lock input device 128 is engaged with the lock 150, is operable to transition the lock 150 from the unlocking state to the locking state, and may further be operable to transition the lock 150 from the locking state to the unlocking state. The lock input device 150 may, for example, be provided in the form of a pushbutton, a thumbturn, a push/turn button, or a lock cylinder such as the lock cylinder 200.

The latchbolt mechanism 130 generally includes a latchbolt housing 132 and a latchbolt 134 mounted to the latchbolt housing 132 for movement between an extended position and a retracted position. In the extended position, the latchbolt 134 is operable to retain the door 90 in a closed position. With the latchbolt 134 in the retracted position, the door 90 is free to move between the closed position and an open position. The latchbolt mechanism 130 is operably connected with the outside assembly 110 such that the outside handle 140 is selectively operable to retract the latchbolt 134, and is operably connected with the inside assembly 120 such that the inside handle is at least selectively operable to retract the latchbolt 134.

Figure 2:
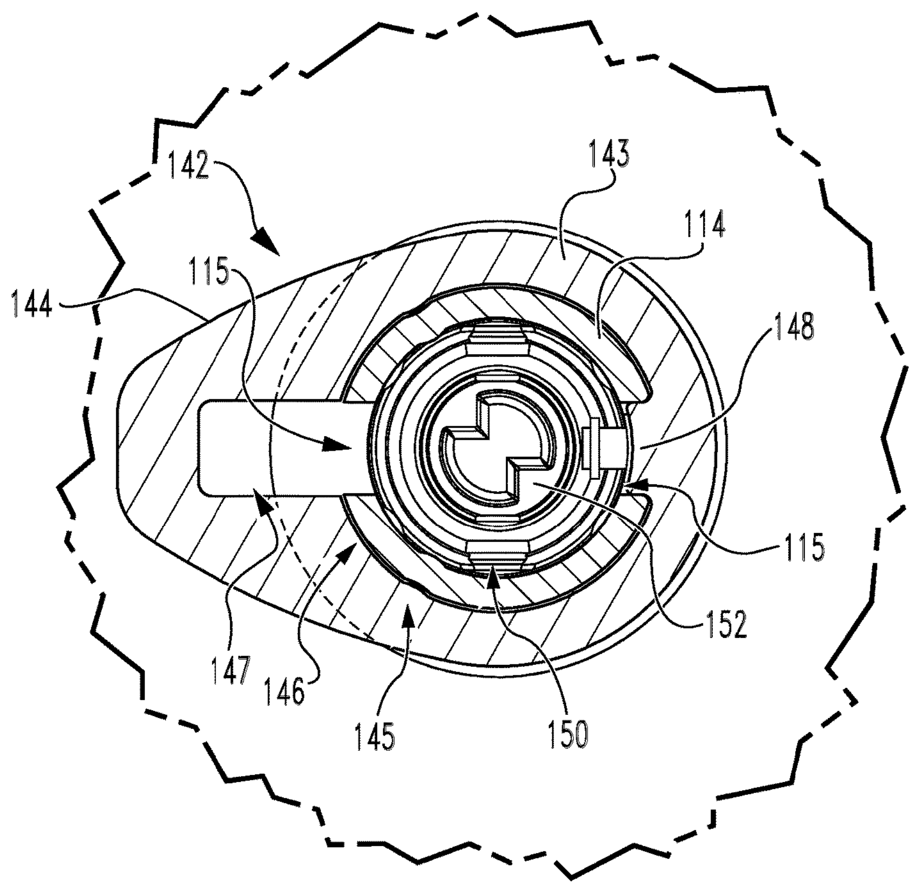
FIG. 2 is a cross-sectional view of a portion of the lockset illustrated in FIG. 1.

With additional reference to FIG. 2, the illustrated outside handle 140 generally includes a shank 142 and a grip portion 141 extending from the shank 142. In the illustrated form, the handle 140 is provided as a lever handle, in which the grip portion 141 is provided as a lever. It is also contemplated that the handle 140 may be provided in the form of a knob handle, in which the grip portion 141 is provided as a knob. The illustrated shank 142 includes a cylindrical portion 143 and an extension 144 extending from the cylindrical portion 143 in the direction of the grip portion 141. Formed within the shank 142 is a chamber 145 including a generally cylindrical portion 146 and an extension 147 projecting from the cylindrical portion 146. The cylindrical portion 146 of the chamber 145 is formed in the cylindrical portion 143 of the shank 142, and the extension 147 of the chamber 145 extends into the extension 144 of the shank 142. Also defined within the chamber 145 is a spline 148 formed opposite the extension 147. The extension 147 is aligned with one of the longitudinal slots 115, and the spline 148 is received in the other of the slots 115 to aid in rotationally coupling the handle 140 with the spindle 114.

The lock 150 includes a rotatable member 152 that receives the tailpiece 220 such that actuation of the lock cylinder 200 by the key 190 causes a corresponding actuation of the lock 150. In certain forms, actuation of the lock 150 by the lock cylinder 200 may transition the lock 150 between the locking state and the unlocking state to selectively permit the outside handle 140 to retract the latchbolt

134. Additionally or alternatively, actuation of the lock 150 may drive the latchbolt 134 from its extended position to its retracted position.

Figure 3:
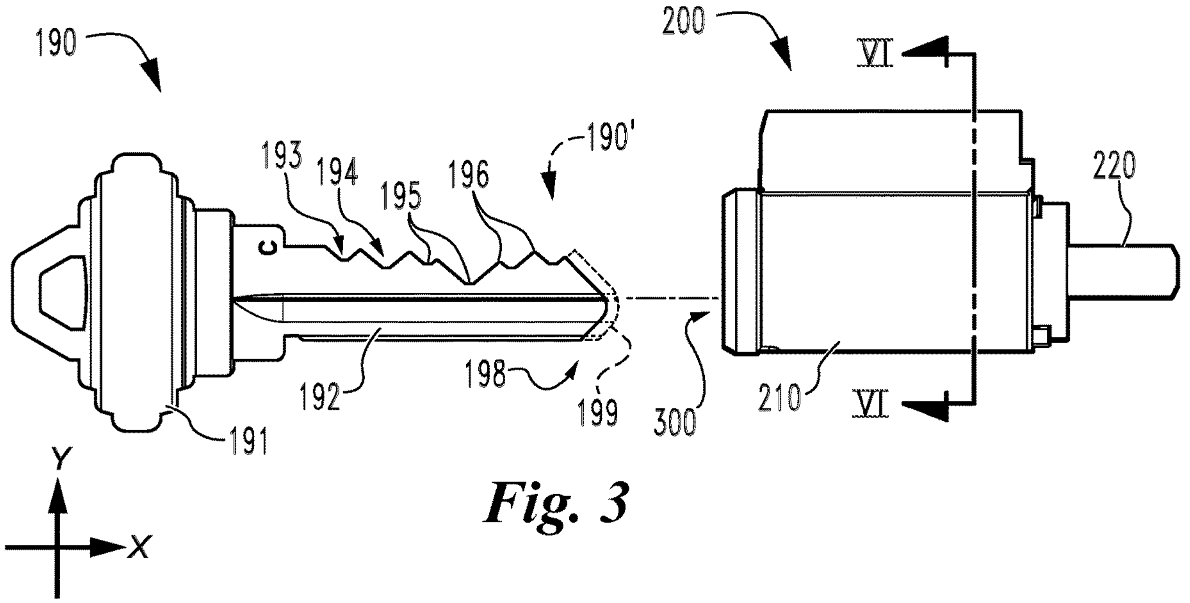
FIG. 3 is a side view of a lock cylinder according to certain embodiments along with a change key and a control key.

With additional reference to FIG. 3, the key 190 generally includes a bow 191 and a blade 192 extending longitudinally from the bow 191. The blade 192 includes a narrow edge 193 defining a bitting profile 194, which includes a plurality of bittings 195 and a plurality of teeth 196. The blade 192 further includes an end portion or tip 198. Depending upon the level of the key 190, the tip 198 may or may not include an extension 199. More particularly, the key 190 may be provided as a change key 190 in which the tip 198 does not include the extension 199, and may alternatively be provided as a control key 190' in which the tip 198 includes the extension 199. As described herein, users possessing a change key 190 will be able to rotate the plug assembly 300 to actuate the lock cylinder 200, but will not be able to remove the plug assembly 300 from the shell 210. Users possessing the control key 190' however, will be able to both actuate the lock cylinder 200 and remove the plug assembly 300 from the shell 210.

Figure 4:
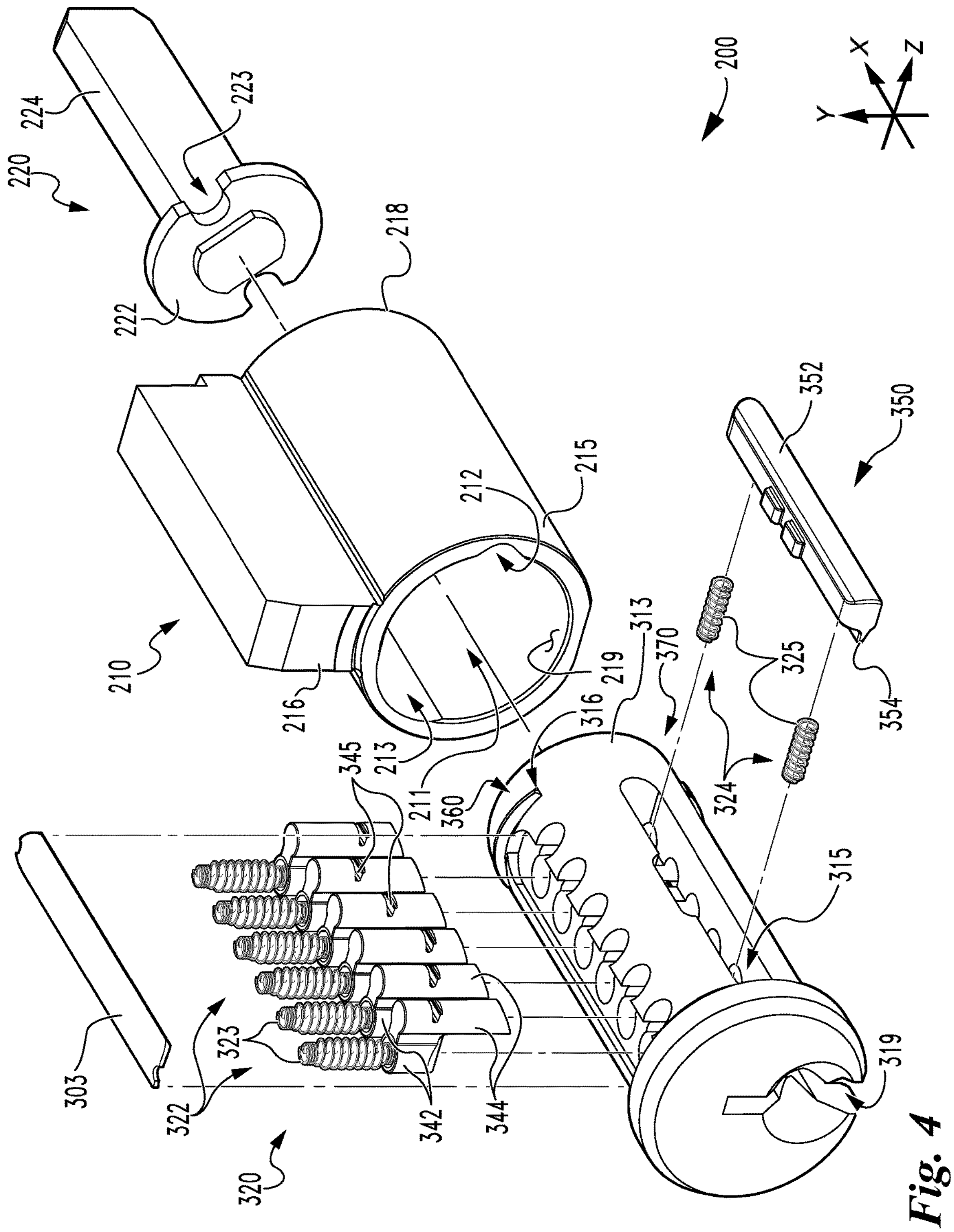
FIG. 4 is a partially-exploded assembly view of the lock cylinder illustrated in FIG. 3.

With additional reference to FIG. 4, the housing or shell 210 defines a generally cylindrical chamber 211 that extends along a longitudinal axis 201, a longitudinal groove 212 connected with the chamber 211, and a longitudinal channel 213 connected with the chamber 211 and angularly offset from the longitudinal groove 212. The chamber 211 is defined by an inner surface 219 of the shell 210, and the groove 212 and channel 213 are defined as elongated recesses in the inner surface 219. In the illustrated form, the housing 210 is provided in the form of a key-in-lever format lock cylinder shell, and generally includes a body 215 and a tower 216 extending from the body 215. The body 215 defines the chamber 211, the groove 212, and the channel 213, and the tower 216 aids in rotationally coupling the shell 210 with the outside handle 240 and/or the outside spindle 114. A distal end of the shell 210 defines an annular shoulder 218 that aids in axially coupling the shell 210 with the plug assembly 300. When the lock cylinder 200 is installed to the lockset 100, the body 215 is seated within the outside spindle 114, and the tower 216 extends into the extension 147 via the slot 115 not occupied by the spline 148. In the illustrated form, the housing is provided as a lock cylinder shell 210 operable to be mounted within the handle 140. It is also contemplated that the housing may be defined by or integrally formed with the handle 140, for example as described below with reference to FIG. 10.

The tailpiece 220 generally includes a plate 222 and a stem 224 extending from the plate 222. The tailpiece 220 is rotationally coupled with the plug assembly 300 such that rotation of the plug assembly 300 rotates the tailpiece 220. The plate 222 may include a recess 223 that facilitates the rotational coupling of the tailpiece 220 with the plug assembly 300 by receiving a portion of a drive pin 332 (FIG. 5).

The plug assembly 300 generally includes a plug 310 rotatably mounted in the chamber 211, a tumbler system 320 configured to selectively prevent rotation of the plug 310 relative to the shell 210, and a retention mechanism 330 configured to selectively prevent axial movement of the plug 310 relative to the shell 210. As described herein, the illustrated tumbler system 320 generally includes a plurality of tumblers 340 and a sidebar 350, and the tumblers 340 selectively retain the sidebar 350 in a radially outward position. Additionally, the retention mechanism 330 generally includes a first plate 360 and a second plate 370, each of which selectively engages the housing 210 to prevent removal of the plug assembly 300 from the housing 210. As described herein, each of the change key 190 and the control key 190' is operable to actuate the tumbler system 320 to enable rotation of the plug assembly 300 relative to the shell 210, but only the control key 190' is operable to actuate the retention mechanism 330 to enable removal of the plug assembly 300 from the shell 210.

Figure 5:
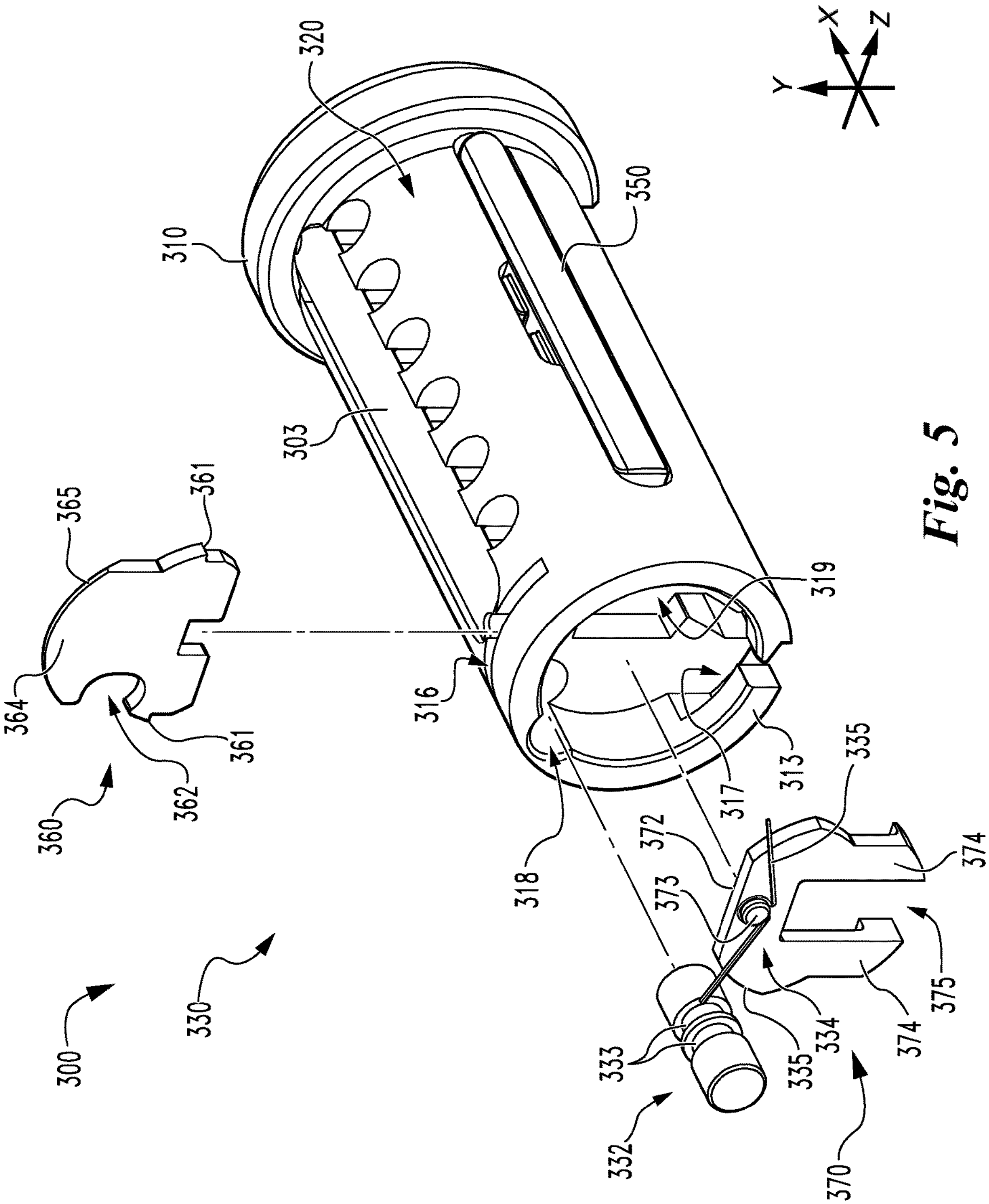
FIG. 5 is a partially-exploded assembly view of the lock cylinder illustrated in FIG. 3.

With additional reference to FIG. 5, the plug 310 generally includes a faceplate 311, a body 312 extending distally from the faceplate 311 to a collar 313, and a keyway 319 operable to receive insertion of the key 190. The faceplate 311 is defined by a proximal end portion of the plug 310, and the body 312 extends distally from the faceplate 311 to a distal end portion that defines the collar 313. The plug 310 is rotatably mounted in the chamber 211 such that a cylindrical shear line 202 (FIGS. 6-8) is defined at the interface between the outer surface of the plug body 312 and the inner surface of the housing 210. More particularly, the shear line 202 corresponds to the circular footprint of the plug body 312 and the circular footprint of the chamber 211, and has a proximal end adjacent the distal side of the faceplate 311 and a distal end adjacent the annular shoulder 218.

The body 312 defines a plurality of tumbler shafts 314 connected with the keyway 319, a longitudinal channel 315 connected with the plurality of tumbler shafts 314, and a plate shaft 316 connected with the keyway 319. The collar 313 is formed at the distal end of the body 312, and has a gap 317 and a recess 318 formed therein. The plug 310 may further include a cover plate channel 302, and the plug assembly 300 may include a cover plate 303 seated in the cover plate channel 302 such that the cover plate 303 at least partially covers the tumbler shafts 314.

As noted above, the illustrated tumbler assembly 320 generally includes a plurality of tumblers 340 and a sidebar 350 that is selectively retained in a radially outward position by the tumblers 340. Each of the tumblers 340 is seated in a corresponding one of the tumbler shafts 314 along with a corresponding and respective biasing member 322 that biases the tumbler 340 toward the keyway 319. In the illustrated form, the biasing members 322 are provided in the form of compression springs 323, which are engaged between the tumblers 340 and the cover plate 303. It is also contemplated that one or more of the biasing members 322 may take another form, such as that of an extension spring, a torsion spring, an elastic member, or a magnet. The sidebar 350 is seated in the longitudinal channel 315, and one or more biasing members 324 bias the sidebar 350 toward its radially outward position. In the illustrated form, the biasing members 324 are provided in the form of compression springs 325, which are engaged between the plug body 312 and the sidebar 350. It is also contemplated that one or more of the biasing members 324 may take another form, such as that of an extension spring, a torsion spring, an elastic member, or a magnet.

As described herein, the tumbler assembly 320 is configured to selectively prevent rotation of the plug assembly 300 relative to the shell 210 by selectively maintaining a portion of the tumbler system 320 in a blocking position in which that portion of the tumbler system 320 crosses the shear line 202. More particularly, the illustrated tumbler assembly 320 has a blocking state in which the tumblers 340 retain the sidebar 350 in its radially outward blocking position and an unblocking state in which the tumblers 340 permit movement of the sidebar 350 toward its radially inward unblocking position. As a result, the tumbler system 320 prevents rotation of the plug assembly 300 relative to the shell 210 when in its blocking state, and permits rotation of the plug assembly 300 relative to the shell 210 when in its unblocking state. While the illustrated tumbler assembly 320 directly engages the housing 210, it is also contemplated that the tumbler assembly 320 may indirectly engage the housing 210 through one or more intermediate components. Additionally, while the illustrated tumbler assembly 320 includes a plurality of L-shaped tumblers 340 and a sidebar 350, it is also contemplated that the tumbler assembly 320 may take another form, such as one including disk tumblers and/or wafer tumblers.

The retention mechanism 330 generally includes the first plate 360 and the second plate 370, and further includes a drive pin 332 to which the first plate 360 is mounted, and a biasing member 334 biasing the plates 360, 370 toward projected positions. In the illustrated form, the biasing member 334 is provided in the form of a torsion spring having a central portion engaged with the second plate 370 and a pair of legs 335 engaged with the first plate 360 such that the biasing member 334 biases the plates 360, 370 in opposite directions. While the illustrated biasing member 334 is provided in the form of a torsion spring, it is also contemplated that the biasing member 334 may take another form, such as that of a compression spring, an extension spring, an elastic member, or a magnet. Additionally, while in the illustrated embodiment a single biasing member 334 urges both the plates 360, 370 to their projected positions, it is also contemplated that the plates 360, 370 may be biased to their projected positions by separate biasing members. The drive pin 332 extends between the recess 318 and the recess 223 such that the drive pin 332 rotationally couples the plug 310 with the tailpiece 220. The drive pin 332 may include one or more annular channels 333, one of which may receive the thickness of the plate 222 to axially couple the tailpiece 220 with the plug 310.

As described herein, the retention mechanism 330 is operable to selectively prevent axial movement of the plug assembly 300 in the proximal direction of plug removal, and has a retaining state and a releasing state. In the retaining state, a portion of the retention mechanism 330 engages the annular shoulder 218 of the shell 210 and prevents axial movement of the plug assembly 300 without preventing rotation of the plug assembly 300 relative to the housing 210. In the releasing state, the portion of the retention mechanism 330 disengages from the shoulder 218 such that the retention mechanism 330 does not prevent axial movement of the plug assembly 300 relative to the housing 210. While the illustrated retention mechanism 330 directly engages the housing 210, it is also contemplated that the retention mechanism 330 may indirectly engage the housing 210 through one or more intermediate components.

Figure 6:
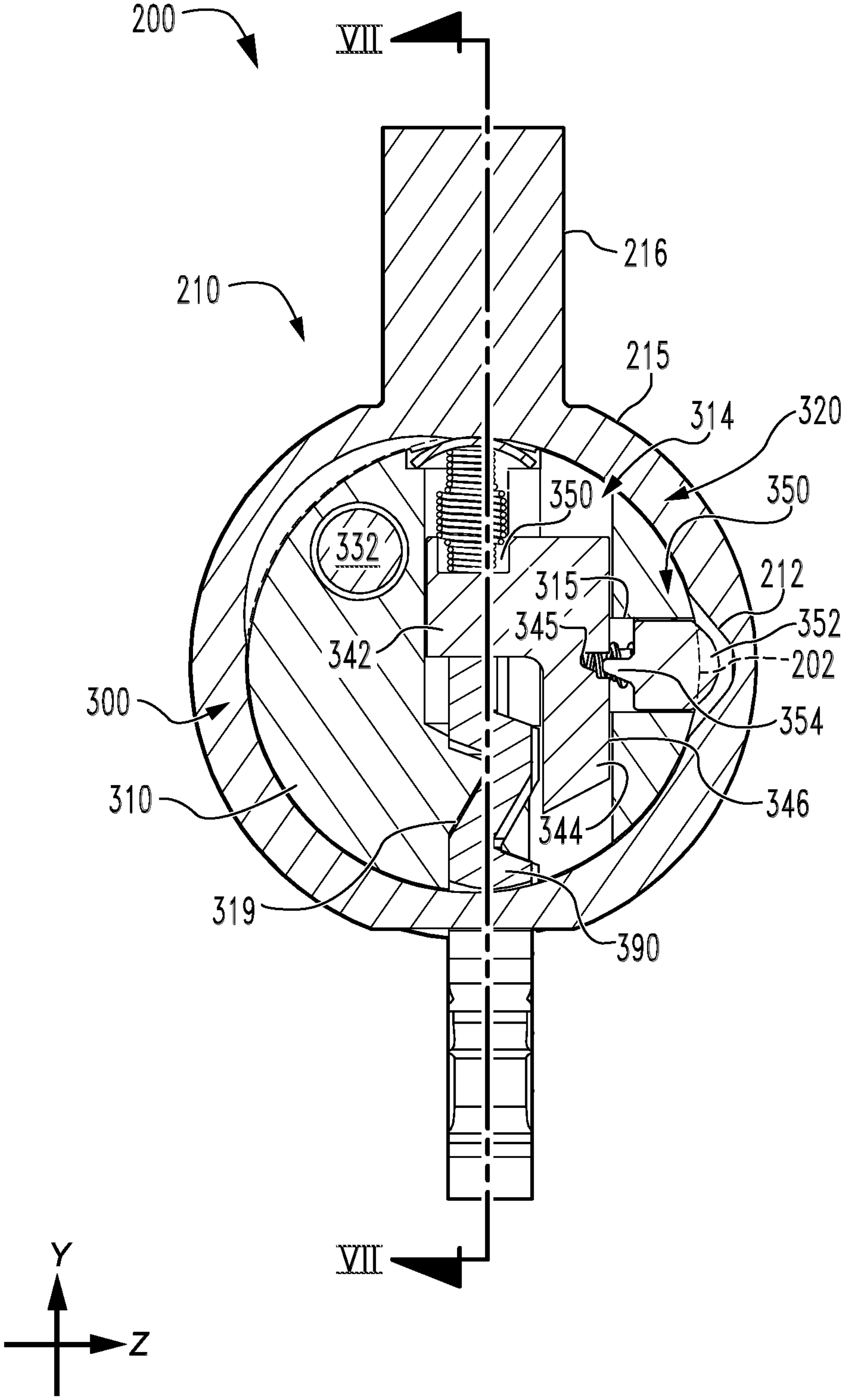
FIG. 6 is a cross-sectional view of the lock cylinder illustrated in FIG. 3, and is taken along the line VI-VI in FIG. 3.

With additional reference to FIG. 6, each tumbler 340 generally includes a first leg 342 defining a cup 343 and a second leg 344 defining a gate 345 and a blocking surface 346 facing the sidebar 350. The cup 343 receives one end of the spring 323, and the opposite end of the spring 323 is engaged with the cover plate 303. As a result, when the key 190/190' is inserted into the keyway 319, the first legs 342 travel along the edge cut 194 such that the transverse position of the tumbler 340 corresponds to the root depth of the blade 192 at the point of contact between the blade 192 and the first leg 342. In the illustrated form, each second leg 344 defines a single gate 345. It is also contemplated that one or more of the tumblers 340 may include a second gate to enable master keying of the lock cylinder 200. Furthermore, while the blocking surface 346 is relatively smooth in the illustrated embodiment, it is to be appreciated that one or more of the second legs 344 may define one or more false gates having a lateral depth less than the depth of the true gate 345.

As described in further detail below, each of the tumblers 340 is biased toward a blocking position in which the blocking surface 346 is aligned with the sidebar 350, and the key 190 is configured to move each of the tumblers 340 to an unblocking position in which the gate 345 is aligned with a projection 354 of the sidebar 350. Additionally, due to the fact that the tumblers 340 are wholly contained within the plug 310, the tower 216 need not include tumbler shafts corresponding to the tumbler shafts 314, and in certain embodiments may be omitted.

The sidebar 350 generally includes a radially outer cam surface 352 and a radially inward projection 354, the latter of which faces the second legs 344 of the tumblers 340. When the plug 310 is in a home position, the sidebar 350 is aligned with the groove 212, and the biasing members 324 bias the sidebar 350 toward its radially outward position, in which the sidebar 350 crosses the shear line 202 such that the cam surface 352 extends into the groove 212. In this state, attempted rotation of the plug 310 will cause the cam surface 352 to engage a sidewall of the groove 212, thereby urging the sidebar 350 toward its radially inward position. As a result, the projection 354 moves into engagement with the second legs 344 of the tumblers 340.

When any of the tumblers 340 is in a blocking position, the projection 354 will engage the blocking surface 346 of the tumbler 340 such that the tumbler 340 blocks the radially inward movement of the sidebar 350, thereby preventing rotation of the plug assembly 300 relative to the shell 210. When each of the tumblers 340 is in an unblocking position, the projection 354 is aligned with a gate 345 of each tumbler 340 such that the sidebar 350 is free to move to its radially inward position. As a result, the tumbler system 320 does not retain the sidebar 350 in the radially outward position in which the sidebar 350 crosses the shear line 202, and instead permits movement of the sidebar 350 to the radially inward position in which the sidebar 350 does not cross the shear line 202. Accordingly, the tumbler system 320 permits rotation of the plug assembly 300 from its home position.

The first plate 360 is mounted in the plate shaft 316, and includes an opening 362 through which the drive pin 332 extends such that the drive pin 332 supports the first plate 360. The opening 362 may be elongated in the transverse direction such that the first plate 360 is movable between a projected position and a depressed position. As noted above, the first plate 360 may be biased toward its projected position, for example by the biasing member 334. In the illustrated form, the first plate 360 includes a pair of shoulders 361 that provide anchor points for the legs 335 of the torsion spring 334. While the illustrated first plate 360 is operable to move from its projected position to a depressed position, it is also contemplated that the first plate 360 may be fixed in its projected position.

The first plate 360 includes a projection 364 that projects beyond the radially outer surface of the plug body 312 at least when the first plate 360 is in its projected position. When the plug assembly 300 is in its home position and the first plate 360 is in its projected position, the projection 364 engages the shoulder 218 of the shell 210 and prevents axial movement of the plug assembly 300 in the proximal direction of plug removal. However, due to the fact that the shear line 202 ends at the shoulder 218, the first plate 360 does not cross the shear line 202, and thus does not prevent rotation of the plug assembly 300. As described in further detail below, the proximal or shoulder-facing side of the projection 364 may include a ramp 365 that facilitates movement of the first plate 360 to its depressed position during removal of the plug assembly 300 from the shell 210.

The second plate 370 includes a base portion 372 and a pair of legs 374 that extend from the base portion 372 such that a slot 379 is defined between the legs 374. The base portion 372 may include a boss 373, and the biasing member 334 may be engaged between the boss 373 and landings 361 of the first plate such that the biasing member 334 biases the first plate 361 and the second plate 370 in opposite directions and toward the projected positions thereof. The legs 374 extend into the gap 317 in the collar 313, and further extend beyond the radially outer surface of the plug body 310 when the second plate 370 is in its projected position. Thus, when the second plate 370 is in its projected position, the legs 374 engage the distal shoulder 218 of the shell 210 and prevent axial movement of the plug assembly 300 in the proximal direction of plug removal. As with the first plate 360, the legs 374 do not break the shear line 202 that ends at the shoulder 218. As a result, the second plate 370 does not prevent rotation of the plug assembly 300, even when in its projected position. When the second plate 370 is moved to its retracted position (e.g., upon insertion of the control key 190'), the legs 374 are retracted within the circular footprint of the plug body 312 and clear the shoulder 218.

Figure 7:
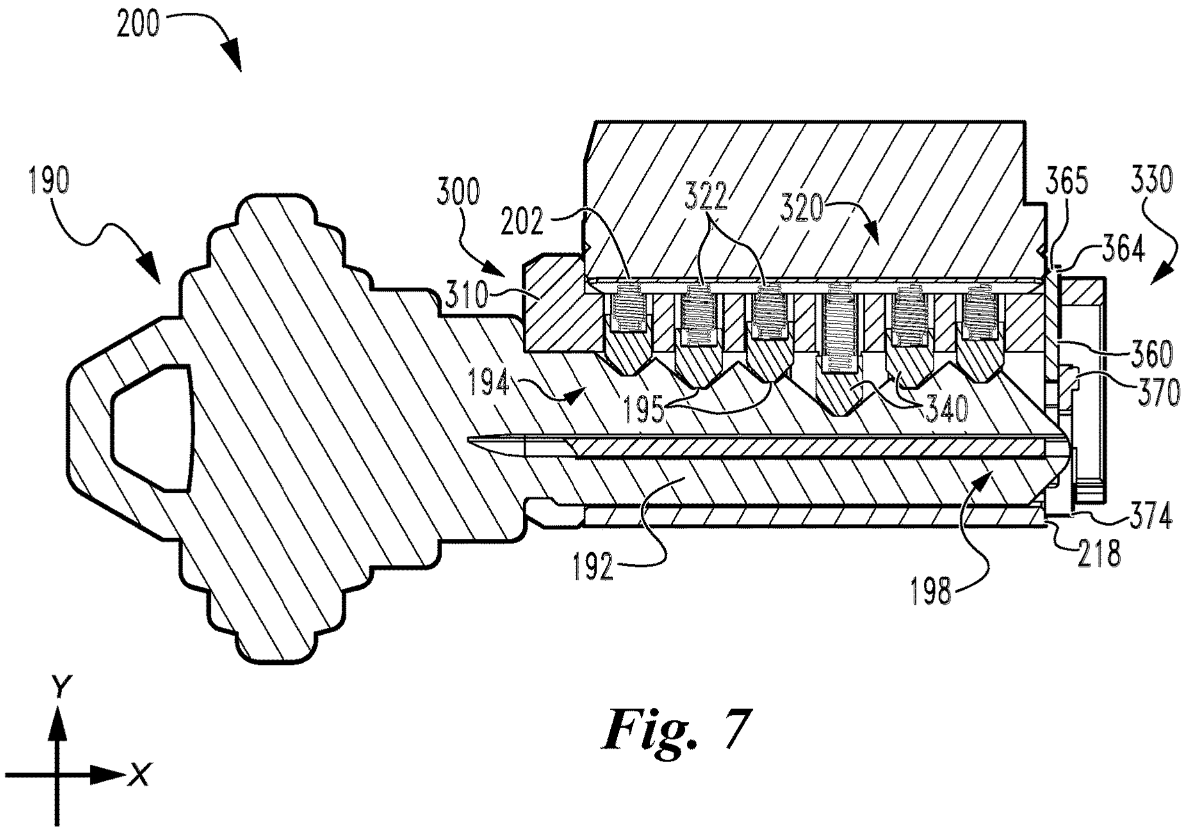
FIG. 7 is a cross-sectional view of the lock cylinder illustrated in FIG. 3 with the change key inserted, and is taken along the line VII-VII in FIG. 6.

With additional reference to FIG. 7, the lock cylinder 200 can be transitioned from a locked state to an unlocked state by inserting the change key 190. As the change key 190 is inserted into the keyway 319, the biasing members 322 urge the second legs 342 into contact with the edge cut 194 such that the transverse positions of the tumblers 340 vary according to the root depth of the blade 192. When the change key 190 is fully inserted, each tumbler 340 is engaged with a corresponding bitting 195. The transverse positions of the gates 345 along the second legs 344 are selected to correspond to the root depth of the key 190 at the bittings 195 such that each tumbler 190 has a gate 345 aligned with the projection 354 when the key 190 is fully inserted. Thus, insertion of the key 190 moves each tumbler 340 to an unblocking position, thereby moving the tumbler system 320 to the unblocking state in which the tumbler system 320 does not retain the sidebar 350 in its radially outward blocking position. As a result, the tumbler system 320 is in its unblocking state, in which the tumbler system 320 permits movement of the sidebar 350 to its radially inward position and enables rotation of the plug assembly 300 relative to the shell 210.

When the plug assembly 300 is rotated to its rotated position, the inner surface of the chamber 211 retains the sidebar 350 in its radially inner position such that engagement between the projection 354 and the sidewalls of the gates 345 prevents transverse movement of the tumblers 340. With transverse movement of the tumblers 340 prevented, engagement between the first legs 342 and the teeth 196 prevents axial movement of the key 190 in the proximal direction of key removal (to the left in FIG. 7). As a result, the blade 192 is retained in the keyway 319 until the plug assembly 300 is returned to its home position.

As noted above, the tip 198 of the change key 190 does not include the extension 199. The length of the blade 192 lacking the extension 199 is selected such that upon full insertion of the change key 190, the tip 198 does not drive the second plate 370 to its retracted position. As a result, the second plate 370 remains in its projected position, in which the legs 374 engage the shoulder 218 and prevent axial movement of the plug assembly 300 in the proximal direction of plug removal (to the left in FIG. 7).

Figure 8:
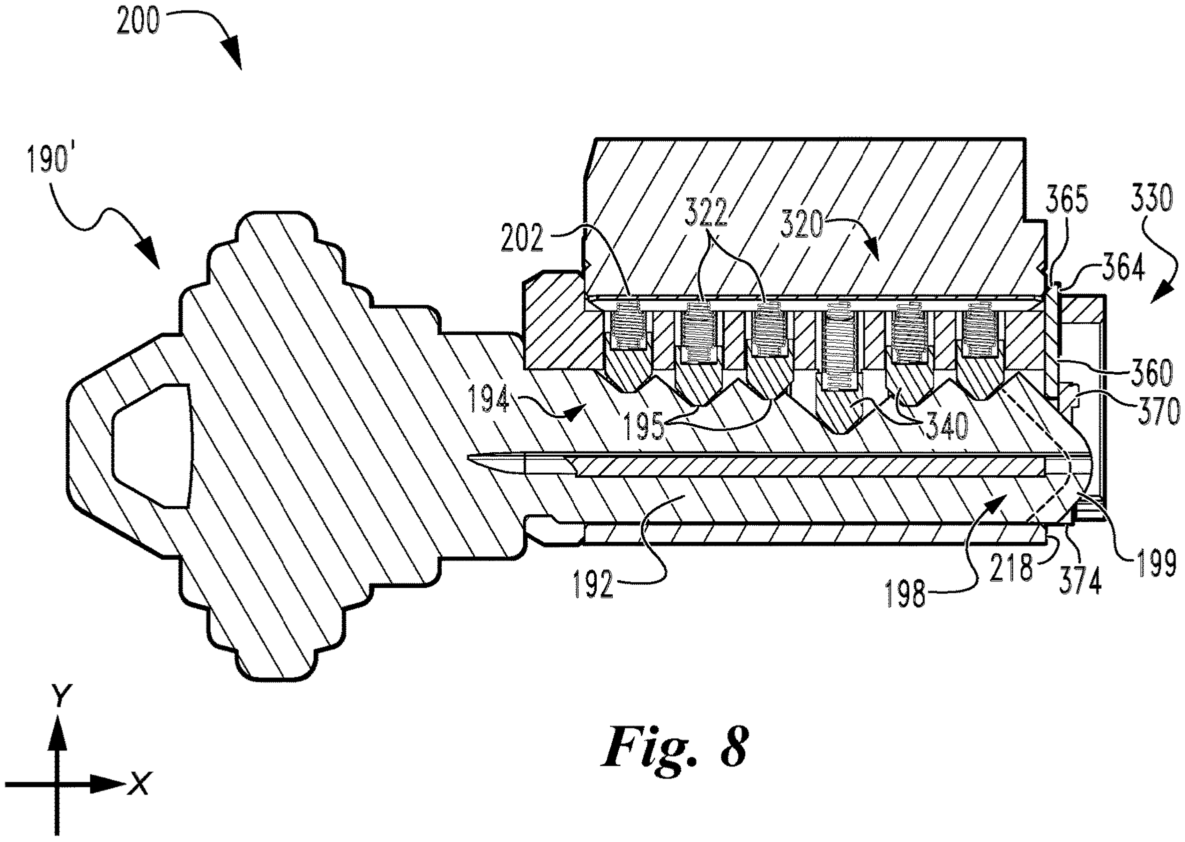
FIG. 8 is a cross-sectional view of the lock cylinder illustrated in FIG. 3 with the control key inserted, and is taken along the line VII-VII in FIG. 6.

With additional reference to FIG. 8, illustrated therein is the lock cylinder 200 upon full insertion of the control key 190'. Due to the fact that the control key 190' has the same bitting code as the change key 190 (or another authorized bitting code in the event that the plug assembly 300 is master keyed), insertion of the control key 190' places each tumbler 340 in its unblocking position. As a result, the plug assembly 300 is rotatable relative to the shell 210 in a manner analogous to that described above with reference to the change key 190.

As noted above, the tip 198 of the control key 190' includes the extension 199 such that the blade 192 of the control key 190' is longer than the blade 192 of the change key 190. The length of the blade 192 including the extension 199 is selected such that upon full insertion of the control key 190', the extension 199 enters the slot 375, engages the base portion 372, and drives the second plate 370 to its retracted position against the force of the biasing member 334.

With the second plate 370 in its retracted position, the second plate 370 does not prevent axial displacement of the plug assembly 300 in the proximal direction of plug removal (to the left in FIG. 8). However, the retaining mechanism 330 may nonetheless prevent such axial displacement while the plug assembly 300 remains in its home position. More particularly, removal of the plug assembly 300 may be prevented by engagement between the first plate 360 and the annular shoulder 218. In such embodiments, the plug assembly 300 may need to be rotated to a predetermined rotational position in order to remove the plug assembly 300 from the housing 210. This predetermined rotational position may alternatively be referred to as the removal-enabling position.

Figure 9:
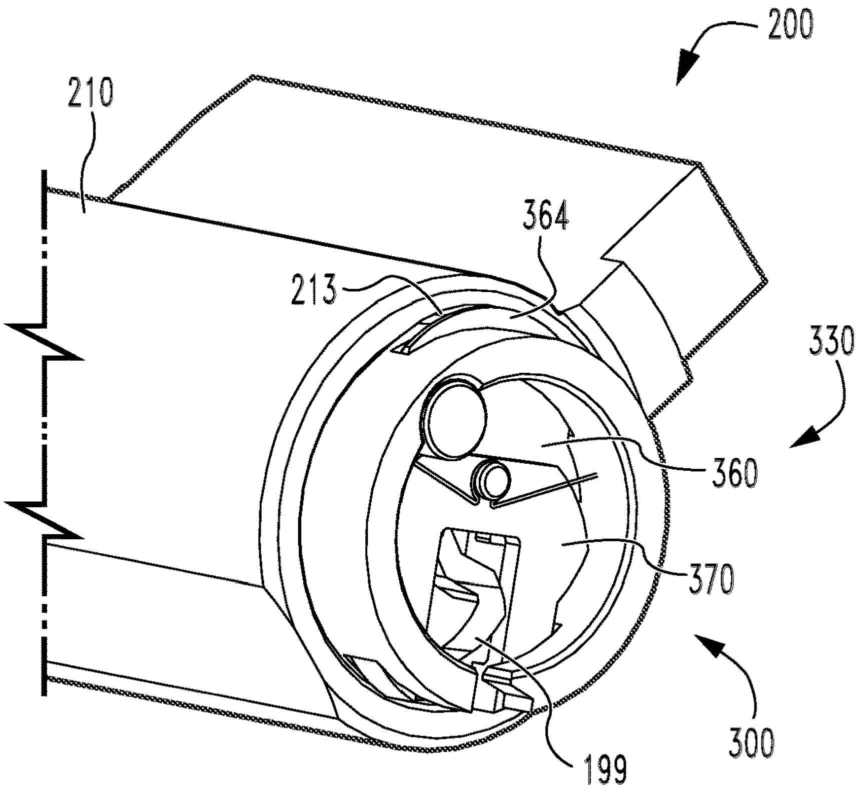
FIG. 9 is a perspective view of a distal end portion of the lock cylinder illustrated in FIG. 3.

With additional reference to FIG. 9, illustrated therein is the lock cylinder 200 with the plug assembly 300 in the removal-enabling position. In this position, the projection 364 of the first plate 360 is aligned with the channel 213 such that the projection 364 is operable to enter the channel 213. In certain forms, such as those in which the first plate 360 is movable relative to the plug 310, the ramp 365 on the projection 364 may engage the end surface of the channel 213 to urge the first plate 360 to its retracted position against the biasing force of the biasing member 334. In other forms, such as those in which the first plate 360 has a fixed position relative to the plug 310, the channel 213 may simply be operable to receive the projection 364. In either event, upon rotation of the plug assembly 300 to the removal-enabling position, the plug assembly 300 is operable to axially slide in the proximal direction of plug removal to enable removal of the plug assembly 300 for re-pinning or replacement.

Figure 10:
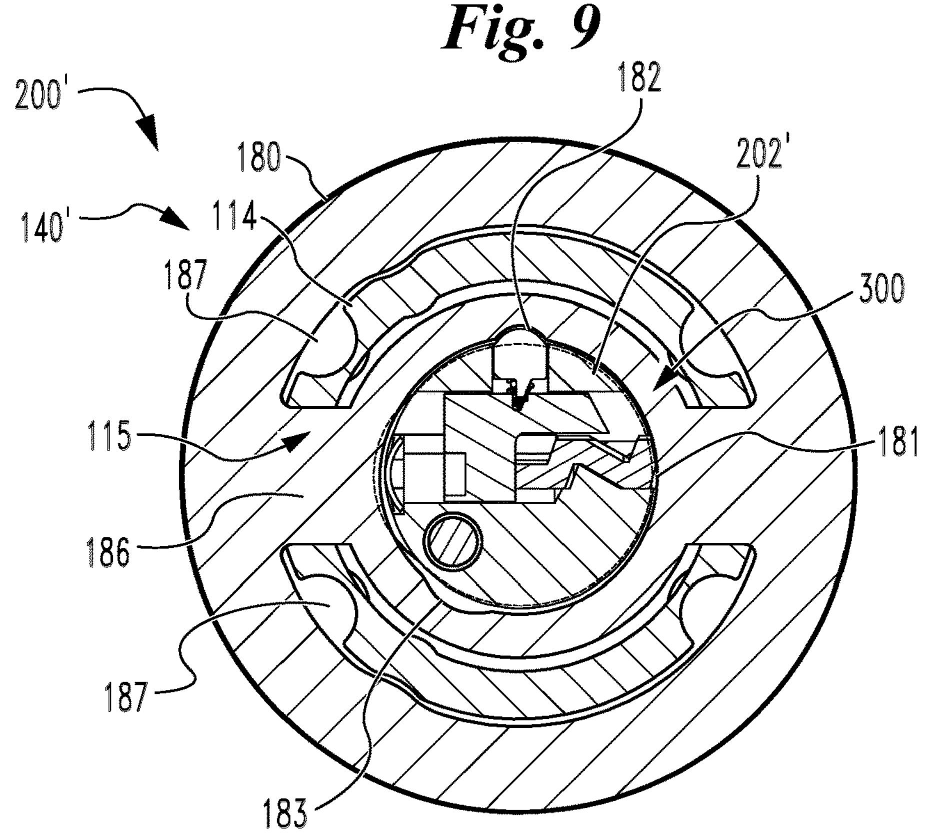
FIG. 10 is a cross-sectional view of a spindle having mounted thereon a handle shank according to certain embodiments.

With additional reference to FIG. 10, as noted above, the housing 210 need not be provided in the form of a lock cylinder shell in certain embodiments. Instead, the housing 210 may be defined by the handle 140 itself. Illustrated in FIG. 10 is an example of a shank 180 for such an embodiment of the handle 140'. The shank 180 may, for example, be used in place of the shank 142 such that the handle 140' is operable to directly receive the plug assembly 300 without the shell 210 being positioned between the shank 180 and the plug assembly 300. Also illustrated in FIG. 10 is the modular plug assembly 300, which in combination with the handle 140' define a lock apparatus 200' according to certain embodiments.

The shank 180 is generally cylindrical, and defines a generally cylindrical chamber 181 corresponding to the chamber 211, a longitudinal groove 182 corresponding to the groove 212, and a longitudinal channel 183 corresponding to the channel 213. The chamber 181, the groove 182, and the channel 183 are defined within an inner region 184 of the shank 180, which is connected to an outer region 185 of the shank 180 by a pair of splines 186. The splines 186 are received in the slots 115 of the spindle 114, and a pair of arcuate cavities 187 are defined between the inner region 184 and the outer region 185 to receive the projecting portions of the spindle 114. A distal end portion of the inner region 184 may define an annular shoulder corresponding to the annular shoulder 218 such that the inner region 184 is operable to be engaged by the retention mechanism 330 in the manner described above.

Due to the fact that the chamber 181, the groove 182, the channel 183, and the distal annular shoulder are defined by the handle 140', the handle 140' may be utilized in place of the above-described housing 210. Thus, a lock system including the handle 140' need not include an additional housing (e.g., the shell 210), and such intermediate housings may be omitted. Additionally, with the need for the tower 216 obviated by the modular plug assembly 300, the shank 180 may omit the extension 144. With the overall footprint required for the housing reduced in size, a greater number of design options are available for the handle 140', such as those lacking extensions 144.

Figure 11:
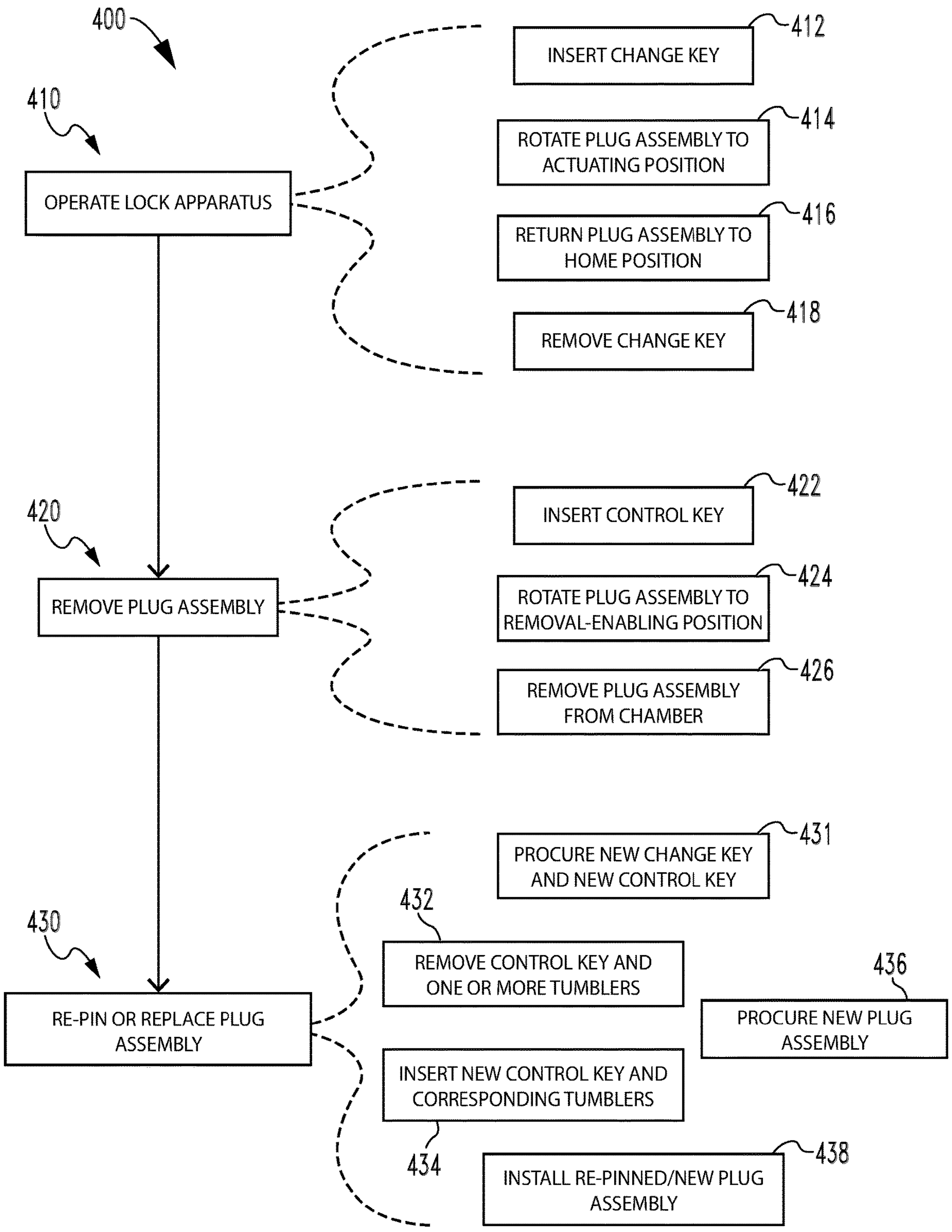
FIG. 11 is a schematic flow diagram of a process according to certain embodiments.

With additional reference to FIG. 11, an exemplary process 400 that may be performed using the plug assembly 300 is illustrated. Blocks illustrated for the processes in the present application are understood to be examples only, and blocks may be combined or divided, and added or removed, as well as re-ordered in whole or in part, unless explicitly stated to the contrary. While the blocks are illustrated in a relatively serial fashion, it is to be understood that two or more of the blocks may be performed concurrently or in parallel with one another. Additionally, while the process 400 is described with specific reference to the lockset 100, lock cylinder 200, and plug assembly 300 illustrated in FIGS. 1-10, it is to be appreciated that the process 400 may be performed utilizing other embodiments of a lockset, a lock cylinder, or a plug assembly.

As described herein, the process 400 generally includes an operating procedure 410 and a removal procedure 420, and may further involve a re-pinning/replacement procedure 430. Additionally, the process 400 may be performed with a lock apparatus including a housing defining a chamber and a modular plug assembly rotatably mounted in the chamber, wherein the modular plug assembly includes a tumbler system selectively preventing rotation of the plug assembly relative to the housing and a retention mechanism selectively retaining the plug assembly within the chamber. As one example, the process 400 may be performed with the lock cylinder 200, which includes a housing in the form of a lock cylinder shell 210 defining a chamber 211 and a modular plug assembly 300 rotatably mounted in the chamber 211, wherein the modular plug assembly 300 includes a tumbler system 320 selectively preventing rotation of the plug assembly 300 relative to the shell 210 and a retention mechanism 230 selectively retaining the plug assembly 300 within the chamber 211. As another example, the process 400 may be performed with the lock apparatus 200', which includes a housing in the form of a handle shank 180 defining a chamber 181 and the modular plug assembly 300, which is rotatably mounted in the chamber 181.

The operating procedure 410 generally involves operating a lock apparatus including a modular plug assembly to rotate a tailpiece operably connected with the modular plug assembly. In certain embodiments, the operating procedure 410 may involve operating the lock cylinder 200 or the lock apparatus 200' to rotate the tailpiece 220.

The operating procedure 410 includes block 412, which generally involves inserting a change key into a plug of the modular plug assembly. For example, block 412 may involve inserting the change key 190 into the keyway 319 such that the change key 190 actuates the tumbler system 320 without actuating the retention mechanism 230. In other words, insertion of the change key 190 drives the tumbler system 320 from its blocking state to its unblocking state to permit rotation of the plug assembly 300, while the retention mechanism 330 is maintained in its retaining state to prevent axial movement of the plug assembly 300 in the proximal direction of plug removal.

The operating procedure 410 may further include block 414, which generally involves rotating the plug assembly relative to the housing from a home position to a first rotated position while the retention mechanism prevents removal of the plug assembly from the housing. For example, block 414 may involve rotating the change key 190 in a first direction while the change key 190 is fully inserted into the keyway 319. As the plug assembly 300 begins to rotate, the groove 212 interfaces with the cam surface 352 to cam the sidebar 350 toward its radially inward position against the force of the biasing members 324.

During rotation of the plug assembly 300, the unactuated retention mechanism 230 prevents removal of the plug assembly from the chamber 181/211. Block 414 may involve rotating the plug assembly 300 from its home position to a first rotated position. As will be appreciated, rotation of the plug assembly 300 may actuate a lock mechanism and/or retract a bolt, such as by actuating the lock 150 and/or retracting the latchbolt 134. It should be noted that even in the event that the plug assembly 300 is rotated to its removal-enabling position in which the projection 364 is aligned with the channel 213, the legs 374 of the projected second plate 370 will nonetheless engage the annular shoulder 218 to prevent removal of the plug assembly 300 from the chamber 211.

The operating procedure 410 may further include block 416, which generally involves returning the plug assembly to its home position. For example, block 414 may involve rotating the change key 190 in a second direction opposite the first direction while the change key 190 is fully inserted into the keyway 319. As the plug assembly 300 returns to its home position, the sidebar 350 becomes aligned with the groove 212, and the biasing members 324 return the sidebar 350 to its radially outward position.

The operating procedure 410 may further include block 418, which generally involves removing the first key from the plug. For example, block 418 may involve removing the change key 190 from the keyway 319, thereby causing the tumbler assembly 320 to return to its blocking state, in which the tumbler assembly 320 retains the sidebar 350 in a radially outward position in which the sidebar 350 crosses the shear line 202/202'.

The removal procedure 420 includes block 422, which generally involves inserting a second key different from the first key into the plug. For example, block 422 may involve inserting the control key 190' into the keyway 319 such that the control key 190' actuates both the tumbler system 320 and the retention mechanism 230. In other words, insertion of the change key 190 drives the tumbler system 320 from its blocking state to its unblocking state to permit rotation of the plug assembly 300, while also driving the retention mechanism 230 to its releasing state to selectively permit axial movement of the plug assembly 300 in the proximal direction of plug removal. When the plug assembly 300 is in its home position, however, such removal of the plug assembly 300 may nonetheless be prevented by the first plate 360, the projection 364 of which engages the annular shoulder 218 when the plug assembly 300 is in its home position.

The removal procedure 420 also includes block 424, which generally involves rotating the plug assembly relative to the housing from a home position to a second rotated position while the second key is inserted in the plug. Block 424 may, for example, involve rotating the control key 190' while the control key 190' is fully inserted into the keyway 319, thereby causing a corresponding rotation of the plug assembly 300 to its removal-enabling position in which the projection 364 is aligned with the channel 213. As will be appreciated, the actuated tumbler system 320 permits such rotation in a manner analogous to that described above with reference to block 414.

The removal procedure 420 also includes block 426, which generally involves removing the plug assembly from the chamber of the housing. For example, block 426 may involve pulling the control key 190' in the proximal direction of plug removal. As noted above, when either key 190/190' is inserted and the plug assembly 300 is rotated from its home position, the tumbler assembly 320 prevents removal of the key 190/190' from the keyway 319. As a result, when the plug assembly 300 is in its removal-enabling position, the control key 190' is axially coupled with the plug assembly 300 such that pulling the key 190' in the proximal direction also pulls the plug assembly 300 in the direction of plug removal. As the plug assembly 300 begins to move in the proximal direction, the edge of the channel 213 may engage the taper 365 of the projection 364 to urge the first plate to its depressed or retracted position. In other embodiments, the channel 213 and the projection 364 may be sized and shaped such that the first plate 360 may retain its position during removal of the plug assembly 300.

It should be appreciated that during removal of the plug assembly 300 from the chamber, the housing may remain static. For example, in embodiments in which the housing is provided in the form of the lock cylinder shell 210, the shell 210 may remain within the chamber 145 defined by the handle 140. In embodiments in which the housing is provided in the form of the shank 180, the shank 180 may retain its position. In either event, the plug assembly 300 is operable to be removed from the handle 140/140' while the handle 140/140' remains installed to the spindle 114.

With the plug assembly 300 removed from the chamber, the process 400 may proceed to the re-pinning/replacement procedure 430. The re-pinning/replacement procedure 430 generally includes block 431, which may involve procuring a new change key 190 and control key 190' with different bitting codes than the original control key and control key 190'. In certain embodiments, the procedure 430 may include block 432, which involves removing the control key 190' and one or more tumblers 340 from the plug 310. In such forms, the procedure 430 may further include block 434, which involves inserting a new control key 190' and one or more new tumblers 340 corresponding to the bitting code of the new control key 190' into the plug 310, thereby generating a recoded plug assembly 300. In other embodiments, the procedure 430 may include block 436, which generally involves procuring a new plug assembly 300 and control key 190 with a different bitting code than the original plug assembly 300. In either event, the procedure 430 may further include block 438, which generally involves inserting the re-pinned plug assembly 300 into the chamber 211/181, returning the installed plug assembly 300 to its home position, and removing the new control key 190'. With the procedure 430 completed, the lockset 100 is operable by the new change key 190, and the plug assembly 300 can be removed by the new control key 190'.

It should be appreciated that the embodiments described herein may be provided in systems or kits, which may take any of a number of forms. As one example, the modular plug assembly 300 may be provided to an end user on its own, or in combination with a change key 190 and/or a control key 190'. Such a system or kit may, for example, be procured for use in the procedure 430. A system or kit may additionally include a lock cylinder shell 210 that facilitates installation of the plug assembly 300 to a handle 140 or another access control mechanism configured for use with lock cylinders of a particular format (e.g., the key-in-lever format). Alternatively, the system or kit may include a purpose-built handle 140' that itself defines the chamber 181, groove 182, and channel 183. In such forms, the shank 180 of the handle 140' may be cylindrical and lack the extension 144 that may otherwise be required to accommodate the tower 216. In certain forms, the shank 180 may have a diameter of about 1.25 inches, such as between 1.1 and 1.4 inches. In certain forms, a lock apparatus (e.g., the lock cylinder 200 or the lock apparatus 200') may be provided in a lockset, such as the lockset 100. Furthermore, such locksets themselves may take any of a number of forms, such as mortise, tubular, cylindrical, or deadbolt. Additionally or alternatively, a plug assembly 300 may be provided in combination with any other form of access control device in which it may be desirable to provide the option of facilitated rekeying, such as exit devices, padlocks, U-locks, or other devices that are controlled by mechanical keys.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:

a modular plug assembly, comprising:

a plug extending along a longitudinal axis and defining a proximal direction and an opposite distal direction, wherein a proximal end portion of the plug defines a faceplate, wherein a plug body extends distally from the faceplate, and wherein the plug body is cylindrical and has a circular footprint;

a sidebar mounted to the plug body for movement between an outer position and an inner position, wherein the sidebar in the outer position projects beyond the circular footprint;

a tumbler mounted to the plug body for movement between a blocking position in which the tumbler retains the sidebar in the outer position, and an unblocking position in which the tumbler does not retain the sidebar in the outer position; and a retention mechanism mounted in a distal end portion of the plug and having a retaining state in which a portion of the retention mechanism projects beyond the circular footprint, and the retention mechanism having a releasing state in which the portion of the retention mechanism is received within the circular footprint; and wherein the retention mechanism comprises a first plate, a second plate, and a spring interposed between the first plate and the second plate and biasing the first plate and the second plate in opposite directions.

2. The system of claim 1, further comprising a housing in which the modular plug assembly is mounted;

wherein the tumbler in the blocking position prevents rotation of the plug assembly relative to the housing;

wherein the tumbler in the unblocking position does not prevent rotation of the plug assembly relative to the housing;

wherein the retention mechanism in the retaining state prevents removal of the plug assembly from the housing; and wherein the retention mechanism in the releasing state does not prevent removal of the plug assembly from the housing.

3. The system of claim 1, further comprising:

a first key configured for insertion into the plug, wherein with the first key fully inserted into the plug, the first key places the tumbler in the unblocking position while the retention mechanism remains in the retaining state; and a second key configured for insertion into the plug, wherein with the second key fully inserted into the plug, the second key places the tumbler in the unblocking position and places the retention mechanism in the releasing state.

4. A system, comprising:

a housing defining a cylindrical chamber; and a plug assembly rotatably mounted in the chamber for rotation relative to the housing between a home position and a rotated position, the plug assembly comprising:

a plug extending along a rotational axis and including a plug body that interfaces with an inner surface of the housing at a cylindrical shear line;

a tumbler assembly movably mounted in the plug, the tumbler assembly having a blocking state in which a portion of the tumbler assembly crosses the cylindrical shear line and prevents rotation of the plug assembly from the home position, the tumbler assembly having an unblocking state in which the tumbler assembly does not prevent rotation of the plug assembly from the home position; and a retention mechanism movably mounted in the plug and having a retaining state in which the retention mechanism prevents axial movement of the plug assembly relative to the housing without preventing rotation of the plug assembly relative to the housing, the retention mechanism having a releasing state in which the retention mechanism does not prevent axial movement of the plug assembly relative to the housing; and wherein the retention mechanism comprises a first plate biased in a first direction toward a first retaining position, and a second plate biased in a second direction toward a second retaining position, and wherein the first direction is different from the second direction.

5. The system of claim 4, further comprising:

a first key configured to move the tumbler assembly from the blocking state to the unblocking state without moving the retention mechanism from the retaining state to the releasing state; and a second key configured to move the tumbler assembly from the blocking state to the unblocking state and to move the retention mechanism from the retaining state to the releasing state.

6. The system of claim 4, wherein the housing comprises an annular shoulder defining a distal boundary of the shear line;

wherein a first portion of the retention mechanism engages the annular shoulder when the retention mechanism is in the retaining state; and wherein the first portion of the retention mechanism disengages from the annular shoulder when the retention mechanism is in the releasing state.

7. The system of claim 4, wherein the retaining mechanism in the releasing state prevents axial movement of the plug assembly relative to the housing when the plug assembly is in the home position; and wherein the retaining mechanism in the releasing state permits axial movement of the plug assembly relative to the housing when the plug assembly is in the rotated position.

8. The system of claim 4, wherein the housing is defined by a door handle.

9. The system of claim 8, wherein the tumbler assembly is operable to directly engage the door handle.

10. The system of claim 4, wherein the first plate is spring-biased in the first direction, and wherein the second plate is spring-biased in the second direction.

11. A modular plug assembly, comprising:

a plug comprising a faceplate and a plug body extending distally from the faceplate, wherein the plug body has a circular footprint;

a sidebar mounted to the plug body for movement between an inner position and an outer position, wherein a portion of the sidebar projects beyond the circular footprint when the sidebar is in the outer position;

a tumbler mounted to the plug body for movement between a locking position and an unlocking position, wherein the tumbler in the locking position retains the sidebar in the outer position, wherein the tumbler in the unlocking position does not prevent movement of the sidebar from the outer position to the inner position, and wherein the tumbler is inoperable to project beyond the circular footprint; and a retention mechanism mounted to the plug body for movement between a retaining state in which a portion of the retention mechanism projects beyond the circular footprint, and a releasing state in which the portion of the retention mechanism is received within the circular footprint; and wherein the retention mechanism comprises a first plate biased in a first direction, and a second plate biased in a second direction different from the first direction.

12. The modular plug assembly of claim 11, wherein the first plate is spring-biased in the first direction, and wherein the second plate is spring-biased in the second direction.

13. A system comprising the modular plug assembly of claim 11, the system further comprising a door handle defining a groove;

wherein the sidebar in the outer position projects into the groove.

* * * * *